United States Patent [19]

Fukuda et al.

[11] Patent Number: 5,369,502

[45] Date of Patent: Nov. 29, 1994

[54] IMAGE DATA PROGRESSIVE RECONSTRUCTION METHOD AND APPARATUS

[75] Inventors: Masahiro Fukuda; Tsugio Noda, both of Isehara, Japan

[73] Assignee: Fujitsu Limited, Kawasaki, Japan

[21] Appl. No.: 210,748

[22] Filed: Mar. 21, 1994

Related U.S. Application Data

[63] Continuation of Ser. No. 743,140, Aug. 9, 1991, abandoned.

[30] Foreign Application Priority Data

Aug. 10, 1990 [JP] Japan .................. 2-213379

[51] Int. Cl.⁵ ............................. H04N 4/415
[52] U.S. Cl. .................... 358/431; 358/432; 348/423
[58] Field of Search .......... 358/261.3, 426, 431, 358/432, 433; 382/56; 348/390, 423; H04N 1/415, 7/133

[56] References Cited

U.S. PATENT DOCUMENTS

| | | | |
|---|---|---|---|
| 4,954,892 | 9/1990 | Asai et al. | 358/431 |
| 4,982,282 | 1/1991 | Saito et al. | 358/261.3 |
| 5,045,938 | 9/1991 | Sugiyama | 358/433 |
| 5,046,071 | 9/1991 | Tanoi | 358/135 |
| 5,121,216 | 6/1992 | Chen et al. | 358/261.3 |
| 5,150,432 | 9/1992 | Ueno et al. | 382/56 |
| 5,293,252 | 3/1994 | Kim et al. | 358/432 |

FOREIGN PATENT DOCUMENTS

2-161887 6/1990 Japan .

OTHER PUBLICATIONS

Yashima et al., "HDTV/Standard-TV Compatible Coding Based on DCT", 1990 *IEEE International Symposium on Circuits and Systems*, vol. 3, May 1, 1990, pp. 1895–1898.

Dubois et al., "Encoding and Progressive Transmission of Still Pictures in NTSC Composite Format Using Transform Domain Methods", *IEEE Transactions on Communications*, vol. COM34, No. 3, Mar. 1, 1986, pp. 310–319.

Patent Abstracts of Japan, vol. 14, No. 515 (E-1000) Nov. 13, 1990 for JP-A-02 214 261 (Fujitsu Ltd) Aug. 27, 1990.

Patent Abstracts of Japan, vol. 15, No. 36 (e-1027) Jan. 29, 1991 for JP-A-02 274028 (NEC Corp) Nov. 8, 1990.

Patent Abstracts of Japan, vol. 14, No. 421 (E-976) Sep. 11, 1990 for JP-A-02 216887 (NEC Corp) Jun. 21, 1990.

European Search Report, The Hague, Mar. 24, 1993.

*Primary Examiner*—Richard Hjerpe
*Assistant Examiner*—Kim Yen
*Attorney, Agent, or Firm*—Staas & Halsey

[57] ABSTRACT

An image data reconstructing method and apparatus, adaptive to both progressive and sequential image buildup modes, reconstructs an orthogonally transformed image by dequantizing transform coefficients decoded from coded data of a continuous tone image, by causing the transform coefficients to have a common data structure through an attachment of a dummy signal representing a zero value DC element. The image data reconstructing method comprises a coded data decoding step, a common data structure one-dimensional quantized transform coefficient creating step, a one-to-two dimensional quantized transform coefficient transforming step, a dequantization threshold storing step, and a two-dimensional quantized transform coefficient dequantizing step. The image date reconstructing apparatus comprises a dummy signal generator for generating such dummy signals and a selector for selecting the dummy signals.

20 Claims, 12 Drawing Sheets

| 10 | 15 | 13 | 14 | 14 | 14 | 14 | 14 |
|----|----|----|----|----|----|----|----|
| 13 | 16 | 19 | 18 | 20 | 24 | 22 | 22 |
| 13 | 15 | 16 | 20 | 18 | 21 | 22 | 22 |
| 14 | 14 | 17 | 21 | 21 | 22 | 23 | 19 |
| 14 | 16 | 17 | 21 | 21 | 22 | 24 | 23 |
| 14 | 15 | 22 | 22 | 22 | 25 | 26 | 24 |
| 15 | 17 | 25 | 29 | 29 | 46 | 33 | 35 |
| 27 | 34 | 39 | 43 | 50 | 62 | 45 | 54 |

FIG. 3
PRIOR ART

| 91  | -17 | -6 | 1  | -2 | 0  | 3  | -2 |
|-----|-----|----|----|----|----|----|----|
| -28 | 8   | 3  | -2 | 1  | 1  | -4 | 2  |
| 14  | -3  | -1 | 1  | -1 | -3 | 3  | -1 |
| -14 | 4   | 1  | -1 | 0  | 1  | -1 | 2  |
| 9   | 1   | 0  | 1  | 2  | -3 | -2 | 0  |
| -6  | 0   | -1 | 1  | 0  | 1  | 0  | 0  |
| -0  | 2   | 1  | -1 | 1  | 0  | -1 | 0  |
| -1  | 0   | 0  | 0  | 0  | 0  | 0  | -1 |

FIG. 5
PRIOR ART

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

FIG. 6
PRIOR ART

| 5 | -2 | 0 | 0 | 0 | 0 | 0 | 0 |
|---|----|---|---|---|---|---|---|
| -3 | 1 | 0 | 0 | 0 | 0 | 0 | 0 |
| 1 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 7
PRIOR ART

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 11 (a) SEQUENTIAL IMAGE BUILDUP

FIG. 11 (b) FIRST STAGE OF PROGRESSIVE IMAGE BUILDUP

FIG. 11 (c) SECOND AND SUBSEQUENT STAGES OF PROGRESSIVE IMAGE BUILDUP

BAND 1
BAND 2
BAND 3
BAND 4
BAND 5
BAND 6
BAND 7
BAND 8

```
STAGE 1: BAND 1
STAGE 2: BAND 1 + BAND 2
STAGE 3: BAND 1 + BAND 2 + BAND 3
STAGE 4: BAND 1 + BAND 2 + BAND 3 + BAND 4
STAGE 5: BAND 1 + BAND 2 + BAND 3 + BAND 4 + BAND 5
STAGE 6: BAND 1 + BAND 2 + BAND 3 + ....... + BAND 6
STAGE 7: BAND 1 + BAND 2 + BAND 3 + ....... + BAND 7
STAGE 8: BAND 1 + BAND 2 + BAND 3 + ....... + BAND 8
```

DL : DC ELEMENT HAVING VALUE "L"
IN : N-TH INDEX (AC ELEMENT)
RM : RUN HAVING LENGTH "M" (AC ELEMENT)
REOB : END-OF-BLOCK COEFFICIENT

*FIG. 13* (a) SEQUENTIAL IMAGE BUILDUP

*FIG. 13* (b) FIRST STAGE OF PROGRESSIVE IMAGE BUILDUP

*FIG. 13* (c) SECOND AND SUBSEQUENT STAGES OF PROGRESSIVE IMAGE BUILDUP

IMAGE DATA PROGRESSIVE RECONSTRUCTION METHOD AND APPARATUS

This application is a continuation of application Ser. No. 07/743,140, filed Aug. 9, 1991, now abandoned.

BACKGROUND OF THE INVENTION

This invention relates to an image data reconstructing method and apparatus for reconstructing an image from coded data of a continuous tone image. More particularly, it relates to an image data reconstructing apparatus and method for reconstructing by selecting sequential image buildup or progressive image buildup from coded data of a continuous tone image coded by the adaptive discrete cosine transform coding method.

DESCRIPTION OF THE RELATED ART

Conventionally, an adaptive discrete cosine transform ceding method is used as a highly efficient method for compressing image data, for example.

The following is a description of the adaptive discrete cosine transform coding method (, or the ADCT method in short).

According to the ADCT method, images are divided into blocks comprising e.g. $8 \times 8$ picture elements. DCT coefficients expressing the distribution of space frequencies are determined by performing two-dimensional discrete cosine transforms (hereafter abbreviated as DCTs) for the image signals from respective divided blocks. The image signals are coded by quantizing the DCT coefficients using thresholds corresponding to visual requirements, according to a Huffman table obtained statistically from the quantized coefficients.

FIG. 1 is a block diagram of a conventional coding circuit per the ADCT method.

FIG. 2 shows exemplary data for an original image received by a conventional two-dimensional DCT unit.

FIG. 3 shows exemplary DCT coefficients representing space frequency distributions.

The coding operation per the ADCT method is described below.

A two-dimensional DCT unit 24 receives from an input terminal 23 sixty-four (64) image signals, such as those shown in FIG. 2, for a block comprising $8 \times 8$ picture elements. By orthogonally transforming the received image signals, the two-dimensional DCT unit 24 transforms them into coefficients having space frequency distributions such as those shown in FIG. 3, thereby calculating DCT coefficients, and outputs them to a linear quantizer 25.

FIG. 4 is a block diagram of the two-dimensional DCT unit 24. A one-dimensional DCT unit 30 performs one-dimensional DCTs for the image signals inputted from the input terminal 23, and a transposer 31 transposes the matrix obtained from the one-dimensional DCT unit 30. Then, a one-dimensional DCT unit 32 performs one dimensional DCTs, as with the one-dimensional DCT unit 30 described earlier. As with the transposer 31 described earlier, a transposer 33 transposes the matrix obtained at the one-dimensional DCT unit 32 and outputs it to a terminal 34. Through similar performances for all blocks of image blocks, the inputted image signals are transformed to the DCT coefficients FIG. 5 is a table of thresholds for quantizing DCT coefficients.

FIG. 6 is a table of exemplary quantized DCT coefficients.

Further explanation is made by referring back to FIG. 1. The linear quantizer 25 quantizes the inputted DCT coefficients by the quantization matrix 22 comprising the thresholds shown in FIG. 5 and determined biased on visual experimentation. The linear quantization produces quantized coefficients such as those shown in FIG. 6, which indicate that the DCT coefficients smaller than thresholds become 0, thereby forming quantized coefficients in which the DC elements and only a few AC elements have non-zero values.

Generally, the higher the visual sensitivities the lower the space frequencies are, and the lower the visual sensitivities the higher the space frequencies are. Therefore, as shown in FIG. 5, the absolute values of the quantization matrix elements, i.e. the thresholds for DCT coefficients corresponding to lower space frequencies, are smaller, and the absolute values corresponding to higher space frequencies are larger. Accordingly, as shown in FIG. 6, of quantized coefficients, only the DC element at the top left end and a very few AC elements representing low space frequency elements become significant coefficients having non-zero values, whereas all others become insignificant coefficients, in most cases.

FIG. 7 shows the order of scanning the generated quantized coefficients (from the lower frequency elements to the higher frequency elements of the space frequencies).

The linear quantizer 25 transforms the two-dimensionally arrayed quantized coefficients into a one-dimensional form according to the zigzag scanning order shown in FIG. 7 and outputs them to a variable length coder 26 in the next stage.

Upon receipt of these quantized coefficients, the variable length coder 26 codes the quantized coefficients by referring to a coding table 27 composed of a Huffman table created by statistical volumes for the respective images. As for their DC elements, the differences between the DC elements of the present and preceding blocks are coded in variable lengths. As for their AC elements, the values of the AC elements (hereafter referred to as indices) of significant coefficients (non-zero value coefficients) and the run lengths (hereafter referred to as runs) of the insignificant coefficients (zero value coefficients) are coded in variable lengths. The output terminal 28 sequentially outputs the coded data to the external units.

Meanwhile, the coded data obtained by the coding circuit per the ADCT method are reconstructed as images according to the following method.

FIG. 8 is a block diagram of a conventional decoding circuit per the ADCT method.

A variable length decoder 41 receives the coded data inputted from an input terminal 40. The variable length decoder 41 decodes the received coded data into fixed length data of the indices and runs and outputs the decoded data to a dequantizer 43, according to a decoding table 42 formed by a table which is the inverse of the Huffman table composing the coding table 27.

On receiving the decoded data (the decoded quantized coefficients), the dequantizer 43 restores the dequantized DCT coefficients through a dequantization by multiplying the respective decoded data by the thresholds stored at the corresponding positions in a quantization matrix 48. The dequantizer 43 outputs the restored dequantized DCT coefficients to a two-dimensional inverse DCT unit 44.

The two-dimensional inverse DCT unit 44 orthogonally transforms the received dequantized DCT coefficients into image signals indicating the distribution of the space frequencies.

The two-dimensional inverse DCT unit 44 is explained in further detail.

FIG. 9 is a block diagram of a conventional two-dimensional inverse DCT unit of an ADCT decoding circuit.

A one-dimensional inverse dequantized DCT unit 51 performs one-dimensional inverse DCTs for the DCT coefficients inputted from a terminal 50 and outputs them to a transposer 52. The transposer 52 transposes the matrix representing the outputs from the one-dimensional inverse DCT unit 51. A one-dimensional inverse DCT unit 53 again performs one-dimensional inverse DCTs on the transposed matrix obtained from the matrix transposition at the transposer.52. As with the transposer 52, a transposer 54 transposes the matrix representing the outputs from the one-dimensional inverse DCT unit 53. A terminal 45 displays signals obtained by these processes, thereby reconstructing the images.

A conventional method for reconstructing coded data transformed by ADCT is the sequential image buildup which is the same as the sequential reconstruction method used for a generic hard copy communication in which an image is reconstructed from the top to the bottom.

However, since the sequential reconstruction method takes a constant amount of time for reconstruction regardless of the data volume, a progressive image buildup method is adopted for high-speed searching such as searching through a database, by which a rough image is reconstructed at an early stage, however, the image quality is bad, and the image quality, is improved gradually.

FIG. 10 is a block diagram of a conventional dequantizer.

Since an ADCT needs to deal with two types of reconstructing methods which are sequential image buildup and progressive image buildup, a conventional dequantizer 43 is configured as shown in FIG. 10.

In FIG. 10, a variable length decoder 41 decodes coded data inputted from an input terminal 60, and a sequential image buildup coefficient reconstructer 62 and a progressive image buildup coefficient reconstructor 63 receive the decoded one-dimensional quantized DCT coefficients, the dequantization of which is controlled by a dequantization controller 66, according to a signal STA for specifying the kind of reconstructing method inputted from an input terminal 61.

FIGS. 11A, 11B and 11C respectively show the data structures of conventional one-dimensional quantized DCT coefficients for use in a sequential image buildup, the first stage of a progressive image buildup and the second and later stages of a progressive image buildup.

As shown in FIG. 11A, the one-dimensional quantized DCT coefficients received by the sequential image buildup coefficient reconstructor 62 have a configuration such that the head end of a block is always a DC element coefficient D5 and the rest comprises runs (R0 and R5) and indices (I-2, I-3, . . . ). When the signal STA specifies sequential reconstruction, two-dimensional quantized DCT coefficients in all regions in a block are reconstructed from respective one-dimensional DCT coefficients, selected by a selector 64 such as a multiplexer, and received and stored by a quantized coefficient storing unit 65.

A multiplier 105 dequantizes quantized DCT coefficients stored in the quantized coefficient storing unit 65 by sequentially multiplying them by quantization thresholds stored in the quantization threshold storing unit 2, which are outputted from an output terminal 67.

FIG. 12 shows an example of dividing two-dimensional quantized DCT coefficients into bands, i.e. one-dimensional quantized DCT coefficient regions, in a progressive image buildup.

As shown in FIG. 12, a block is divided into plural kinds of regions (hereafter referred to as "bands"), and the coefficients in a band are selected as significant coefficients, and all others are replaced by "0" in respective stages of a progressive image buildup by ADCT.

More concretely, when band 1 (having only a DC element) is selected in a first stage, since the inputted one-dimensional quantized DCT coefficients comprise only coefficients of the DC element, as shown in FIG. 11B, and two-dimensional quantized DCT coefficients are reconstructed by setting the rest of the 8×8 two dimensional quantized DCT coefficients obtained by coding the 8×8 picture elements of a block in an image, i.e. the sixty-three (63) AC element coefficients, to "0".

When band 2 is selected in a second stage, since one-dimensional quantized DCT coefficients comprise runs indicating the number of zeros and indices indicating the values of AC elements, as shown in FIG. 1C, coefficients in band 2 is reconstructed from respective coefficient values and coefficients in all other regions are set to "0", thereby reconstructing two-dimensional quantized DCT coefficients.

Thereafter, similarly, coefficients in bands corresponding to respective stages are reconstructed as significant coefficients, and coefficients in all other regions are set to "0", thereby reconstructing two-dimensional quantized DCT coefficients.

The progressive coefficient reconstructor 63 performs the following operations for a progressive image buildup. When the dequantization controller 66 selects a progressive image buildup, a coefficient reconstructor 71 in the progressive coefficient reconstructor 63 receives one-dimensional quantized DCT coefficients according to the stage number PST of the specified progressive image buildup, and reconstructs two-dimensional quantized DCT coefficients according to methods corresponding to respective stages. An address generator 72 generates two-dimensional addresses for the head end and tail end of the respective reconstruction stages. A mask processor 73 masks coefficients in regions other than the generated addresses to "0". The selector 64 selects two-dimensional quantized DCT coefficients in all regions in a block. The quantized coefficient storing unit 65 receives the two-dimensional quantized DCT coefficients selected by the selector 64. That is, the quantized coefficient storing unit 65 stores the two-dimensional quantized DCT coefficients outputted from the progressive coefficient reconstructor 63.

The multiplier 105 sequentially reads the two-dimensional quantized coefficients stored in the quantized coefficient storing unit 65 and multiplies them by quantization thresholds stored in the quantization threshold storing unit 2, thereby dequantizing them, and outputting the result to the terminal 67.

Thus, a dequantization according to either sequential image buildup or progressive image buildup is performed.

However, a conventional image data reconstructing method or apparatus for performing both sequential image buildup and progressive image buildup such as the one described above has a problem of the circuit size being larger than the circuit size of a circuit corresponding to only the image buildup method, because it requires separate dequantizing circuits for sequential image buildup and progressive image buildup, controls operations of the circuit corresponding to the selected reconstruction method, and selects obtained DCT coefficients.

SUMMARY OF THE INVENTION

This invention relates to an image data reconstructing method and apparatus for reconstructing an image from coded data of a continuous tone image. More particularly, it relates to an image data reconstructing apparatus and method for reconstruction by selecting sequential image buildup or progressive image buildup, from coded data of a continuous tone image, coded by the adaptive discrete cosine transform coding method.

It aims at downsizing the image data reconstructing circuit by standardizing the data structure of the quantized DCT coefficients in a sequential image buildup with that of the data structure in a progressive image buildup.

Hence, when the coded data do not have the DC element difference between the current block and the preceding block, this invention causes dummy signals indicating zero value DC elements to be attached to the head ends of data structures of quantized DCT coefficients having only AC elements in the second and later stages of a progressive image buildup, so that such quantized DCT coefficients have the same data structure as the quantized DCT coefficients in the first stage of a progressive image buildup having the DC element.

A feature of this invention resides in an image data reconstructing method comprising a coded data decoding step, a common data structure one-dimensional quantized DCT coefficient creating step, a one-to-two dimensional quantized DCT coefficient transforming step, a dequantization threshold storing step, and a two-dimensional quantized DCT coefficient dequantizing step.

Another feature of this invention resides in an image data reconstructing apparatus embodying the above method. The crucial distinction of such an apparatus includes a dummy signal generator for generating such dummy signals and a selector for selecting the dummy signals. Since the data structure of the quantized DCT coefficients in the first stage has the DC element at the head end and an end-of-block signal REOB at the tail end as with the data structure of quantized DCT coefficients in a sequential image buildup, a common dequantizer adaptively performs a sequential image buildup and a progressive image buildup. Such dummy signals the selector selects can be either dummy coded data or the dummy decoded data being zero value DCT coefficients.

BRIEF DESCRIPTION OF THE DRAWINGS

FIG. 3 is a table of exemplary DCT coefficients representing space frequency distributions;

FIG. 5 is a table of thresholds for quantizing DCT coefficients;

FIG. 6 is a table of quantized DCT coefficients;

FIG. 7 is a diagram illustrating the order of zigzag scanning of the generated quantized coefficients;

DESCRIPTION OF THE PREFERRED EMBODIMENTS

Figure 13:
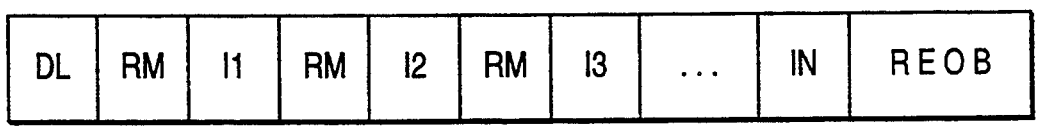
FIG. 13A, 13B and 13C are diagrams of the data structures of one-dimensional quantized DCT coefficients for use in a sequential image buildup, the first stage of a progressive image buildup and the second and later stages of a progressive image buildup, respectively.
Figure 13:
Figure 13:
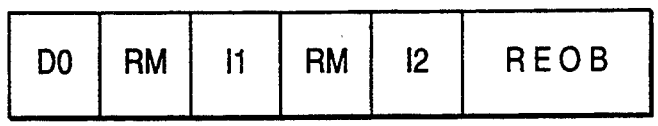

FIGS. 13A, 13B and 13C respectively show the data structures of one-dimensional quantized DCT coefficients for use in a sequential image buildup, the first stage of a progressive image buildup and the second and later stages of a progressive image buildup.

The embodiment relates to an image data reconstructing apparatus and method for reconstructing an image from coded data obtained by coding quantized coefficients, which are obtained by quantizing DCT coefficients obtained by performing two-dimensional discrete cosine transforms on the gradient values of plural picture elements in respective blocks each comprising a plurality (N×N; where N is a positive integer) of picture elements from an original image, in which either the sequential image buildup mode for sequentially building up images or the progressive image buildup mode for progressively building up fine images from rough images is selected.

This invention configures such an image data reconstructing method to comprise a first step of decoding coded data into one-dimensional quantized DCT coefficients, a second step of creating one-dimensional quantized DCT coefficients having a common data structure comprising a DC element coefficient at the head end as well as a run RM specifying the number of zeros and an index I specifying non-zero AC elements for use by both the sequential image buildup mode (FIG. 13A) and the progressive image buildup mode (FIGS. 13B and 13C), a third step of transforming the one-dimensional quantized DCT coefficients created in the second step into two-dimensional quantized DCT coefficients, a fourth step of storing thresholds for dequantizing quantized DCT coefficients into dequantized DCT coefficients, and a fifth step of dequantizing the two-dimensional quantized DCT coefficients obtained in the third step by applying the thresholds stored in the fourth step, wherein the thresholds stored in the fourth step sequentially dequantize the quantized DCT coefficients created in the second and third steps regardless of the image buildup mode in the fifth step.

Here, the second step also adds dummy signals to the head ends of the one-dimensional quantized DCT coefficients for the second and later stages decoded in the first step during a progressive image buildup. The dummy signals are DCT coefficients having zero values.

Figure 14:
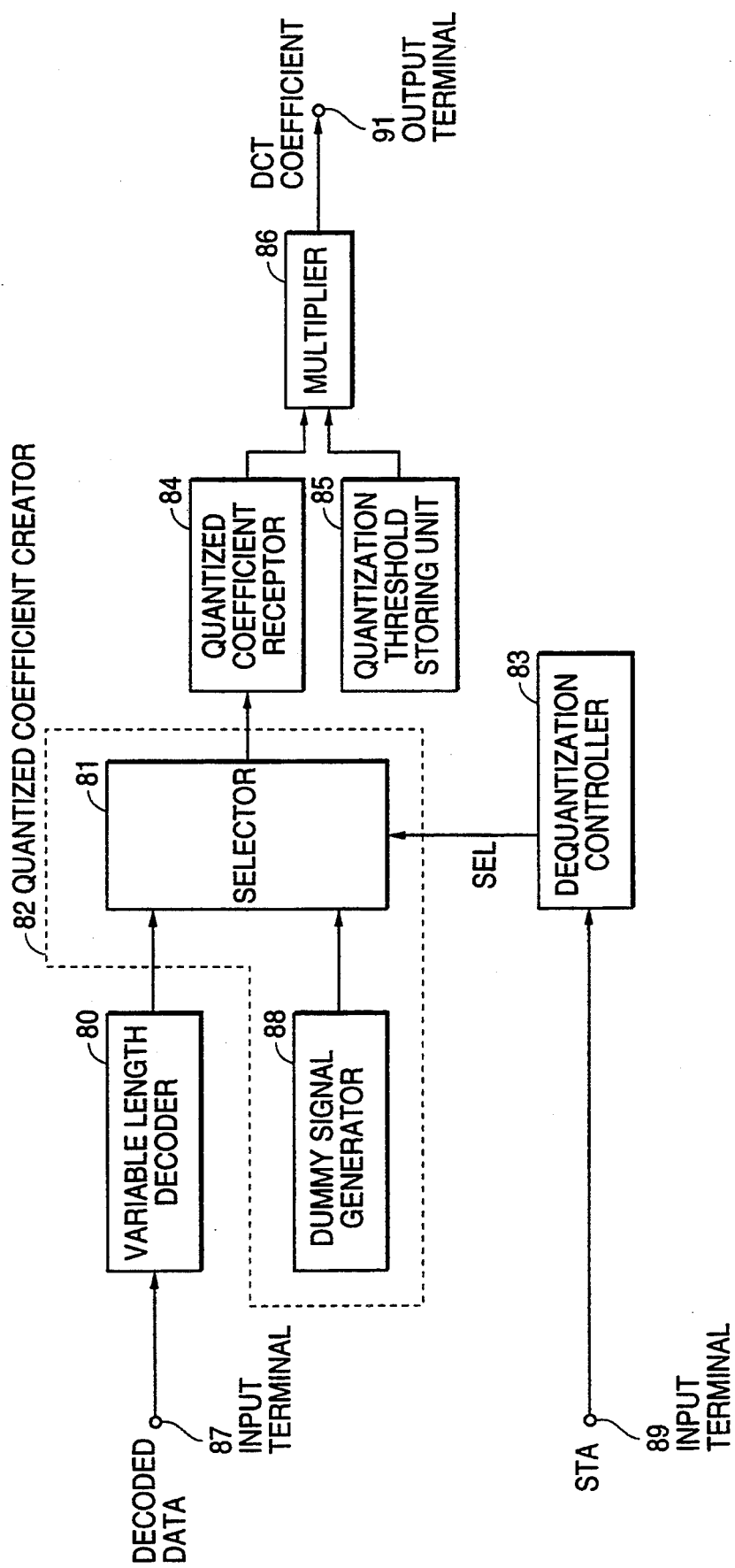
FIG. 14 is a block diagram of an embodiment of this invention.

FIG. 14 is a block diagram of an embodiment of this invention.

This invention configures an image data reconstructing apparatus (FIG. 14) to comprise a dequantization controller 83 for selecting either the sequential image buildup mode for sequentially reconstructing an image or the progressive image buildup mode for progressively reconstructing a fine image from a rough image, a variable length decoder 80 for decoding coded data into one-dimensional quantized DCT coefficients, a quantized coefficient creator 82 for creating from one-dimensional quantized DCT coefficients decoded by the variable length decoder 80 one-dimensional quantized DCT coefficients having a common data structure for both the sequential image buildup mode and the progressive image buildup mode, a quantized coefficient receptor 84 for transforming one-dimensional quantized DCT coefficients into two-dimensional quantized DCT coefficients and for storing the latter, a quantization threshold storing unit 85 for storing thresholds for dequantizing quantized DCT coefficients, and a multiplier 86 for dequantization by multiplying two-dimensional quantized DCT coefficients stored in the quantized coefficient receptor 84 by the thresholds stored in the quantization threshold storing unit 85, wherein one-dimensional quantized DCT coefficients having a data structure common to both the sequential image buildup mode and the progressive image buildup mode are created for a specification of either one.

Here, the quantized coefficient creator 82 has a dummy signal generator 88 for generating dummy signals, which are DCT coefficients having zero values, to be attached to the head ends of the one-dimensional quantized DCT coefficients decoded by the variable length decoder 80 during a progressive image buildup.

Also, the quantized coefficient creator 82 has a selector 81, which may be a multiplexer, for selecting the one-dimensional quantized DCT coefficients from the variable length decoder 80 and dummy signals from the dummy signal generator 88. When the dequantization controller 83 specifies a progressive image buildup, the selector 81 attaches dummy signals to the head ends of one-dimensional quantized DCT coefficients outputted from the quantized coefficient creator 82 in the second and later stages.

The image data reconstructing method and apparatus of this invention configured as above has a common dequantizing circuit to adaptively dequantize two-dimensional quantized DCT coefficients obtained by unifying the data structures of decoded one-dimensionl quantized DCT coefficients in both the sequential image buildup mode and the progressive image buildup mode, thereby eliminating the necessity for having separate circuits respectively for the either mode.

The following is a further explanation of the image data reconstructing method and apparatus of this invention by referring to FIG. 14.

Figures 1, 2:
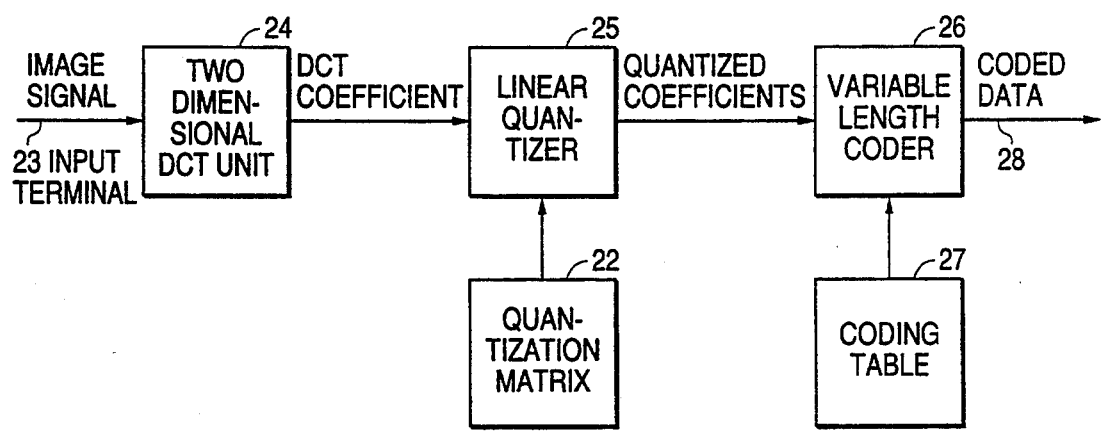
FIG. 1 is a block diagram of a coding circuit per the ADCT method.
FIG. 2 is a table of exemplary data for an original image received by a conventional two-dimensional DCT unit.
Figure 4:
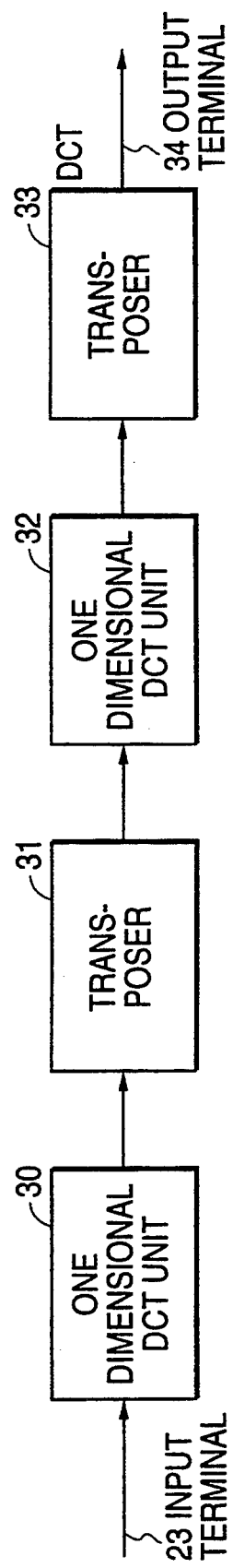
FIG. 4 is a block diagram of a conventional two-dimensional DCT unit.
Figure 8:
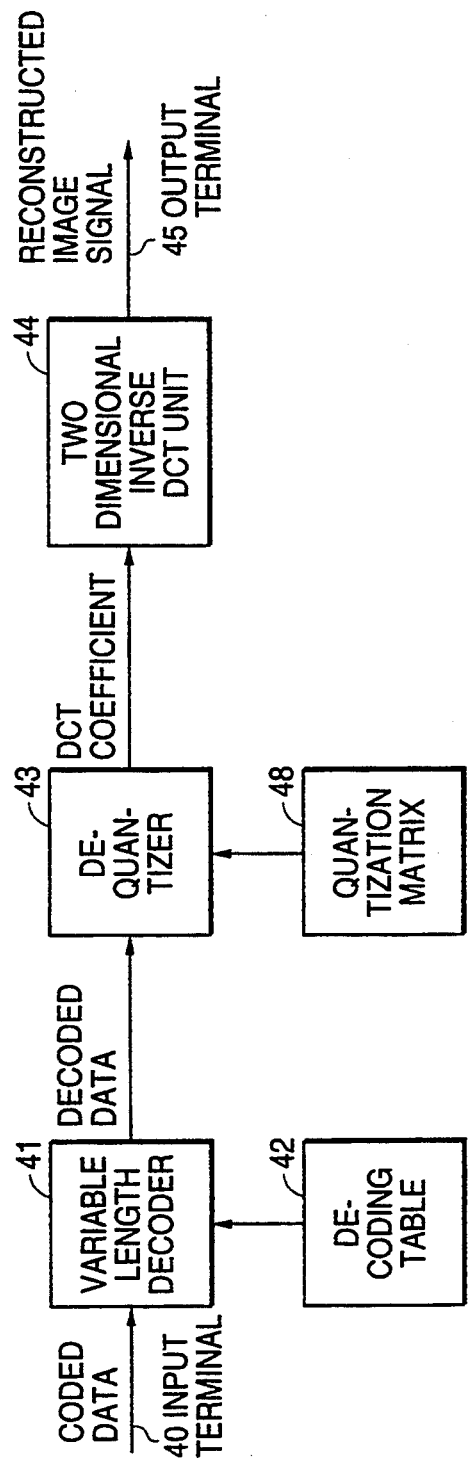
FIG. 8 is a block diagram of a conventional decoding circuit per the ADCT method.
Figure 9:
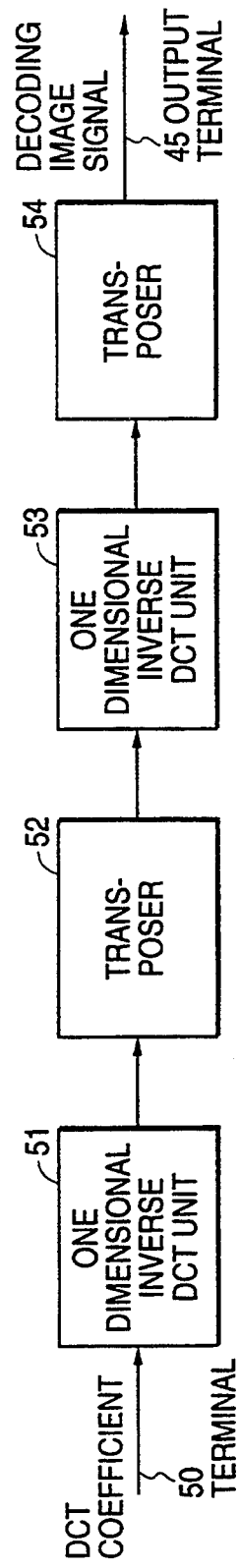
FIG. 9 is a block diagram of a conventional two-dimensional inverse DCT unit of an ADCT decoding circuit.

The dequantizing circuit shown in FIG. 14 is used when coded data obtained by an ADCT coding circuit as shown in FIGS. 1 and 2 is used for an image reconstruction. The two-dimensional inverse DCT unit 44 shown in FIG. 8 receives the outputs from the dequantizing circuit illustrated in FIG. 14.

In FIG. 14, the variable length decoder 80 decodes coded data inputted from an input terminal 87 to one-dimensional quantized DCT coefficients and outputs them to the selector 81. The dummy signal generator 88 constantly outputs to the selector 81 dummy signals, which become a dummy signal "D0" indicating that the DC elements at the head ends of one-dimensional quantized DCT coefficients have zero values. The dequantization controller 83 as a reconstruction mode specifier outputs a selection signal SEL to the selector 81 enabling the selector 81 to selectively output signals from the variable length decoder 80 and the dummy signal generator 88. The dequantization controller 83 receives a specification signal STA specifying either the sequential image buildup mode or the progressive image buildup mode from an input terminal 89.

When the sequential image buildup mode is specified, the dequantization controller 83 instructs the selector 81 to constantly select decoded signals from the variable length decoder 80.

The quantized coefficient receptor 84 sequentially receives one-dimensional quantized DCT coefficients decoded from coded data by the variable length decoder 80 and selected by the selector 81 and reconstructs them to two-dimensional quantized DCT coefficients in a predetermined manner.

That is, one-dimensional quantized DCT coefficients outputted from the variable length decoder 80 such as shown in FIG. 13A are transformed to two-dimensional quantized DCT coefficients in the following manner. As for the DC element in FIG. 13A, since the value DL at the head end represents DC element codes in a variable length indicating the difference from the DC element in the preceding block, the DC element coefficient is obtained by adding the difference to the DC element reconstructed in the preceding block. As for AC elements, since the run RM indicates the number of zeros in succession, the AC element coefficients are stored next as indices I1, I2, . . . , N.

Figure 10:
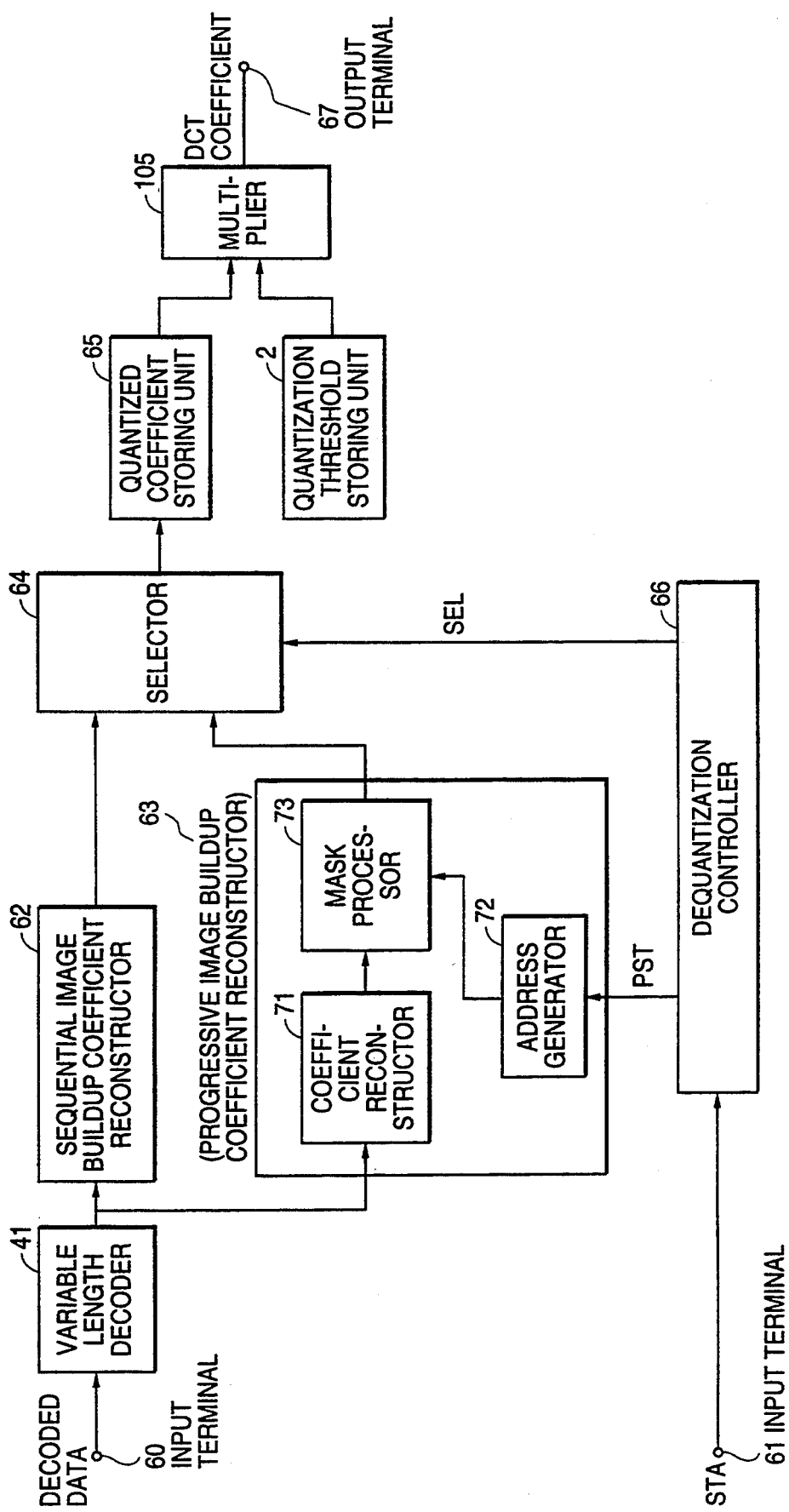
FIG. 10 is a block diagram of a conventional dequantizer.

As a result, the quantized coefficient receptor 84 has a circuit configuration equivalent to combining both the sequential coefficient reconstructor 62 and the quantization coefficient storing unit 65 illustrated in prior art FIG. 10.

The multiplier 86 reads two-dimensional quantized DCT coefficients for a block stored in the quantized coefficient receptor 84 to be multiplied by the quantization thresholds stored in the quantization threshold storing unit 85 for dequantization and then output ted from an output terminal 91.

On the other hand, when the progressive image buildup mode is specified, since the data structure of one-dimensional quantized DCT coefficients decoded by the variable length decoder 80 for the first stage is such that the head end has a value DL specifying the DC element, as shown in FIG. 13B, the data structure is the same as that for the sequential image buildup mode shown in FIG. 13A. The selector 81 selects outputs from the variable length decoder 80 and supplies them to the quantized coefficient receptor 84 for dequantization with the same processing as that for the sequential image buildup mode.

Figure 11:
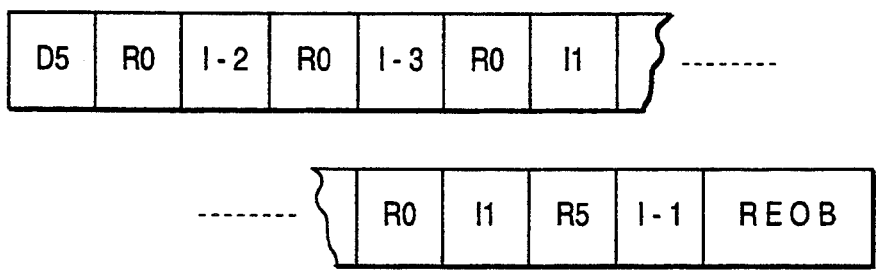
FIG. 11A, 11B and 11C are diagrams of the conventional data structures of one-dimensional quantized DCT coefficients for use in a sequential image buildup, the first stage of a progressive image buildup and the second and later stages of a progressive image buildup, respectively.
Figure 11:
Figure 11:
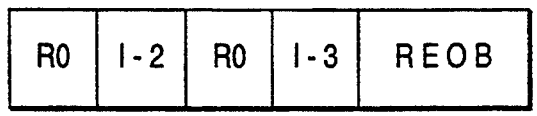
Figure 12:
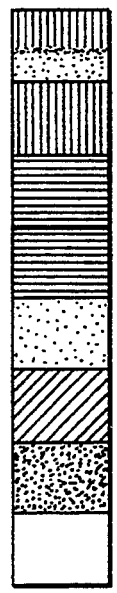
FIG. 12 is a diagram an example of dividing two-dimensional quantized DCT coefficients into bands, i.e. one-dimensional quantized DCT coefficient regions, in a progressive image buildup.

As illustrated in FIG. 11C, in and after the second stage, the data structure of the one-dimensional quantized DCT coefficients decoded by the variable length decoder 80 does not have the value indicating a DC element at the head end and is different from that for the sequential image buildup mode. Therefore, this invention causes the dequantization controller 83 in the second and later stages to instruct the selector 81 to select dummy signals outputted from the dummy signal generator 88 at the timings for reading head ends and to output the dummy signals to the quantized coefficient receptor 84. This processing makes the data structure of the one-dimensional quantized DCT coefficients, as shown in FIG. 13C, which the quantized coefficient receptor 84 receives to be such that the head end becomes a DC element as with the data structure shown in FIG. 13A for the sequential image buildup mode, so that one-dimensional quantized DCT coefficients have the data structure enabling them to be dequantized in the same manner whether the image reconstruction is in the sequential image buildup mode or in the progressive image buildup mode.

By repeating the dequantization for a whole image in block units, dequantized DCT coefficients are reconstructed from quantized coefficients for the whole image.

Figure 15:
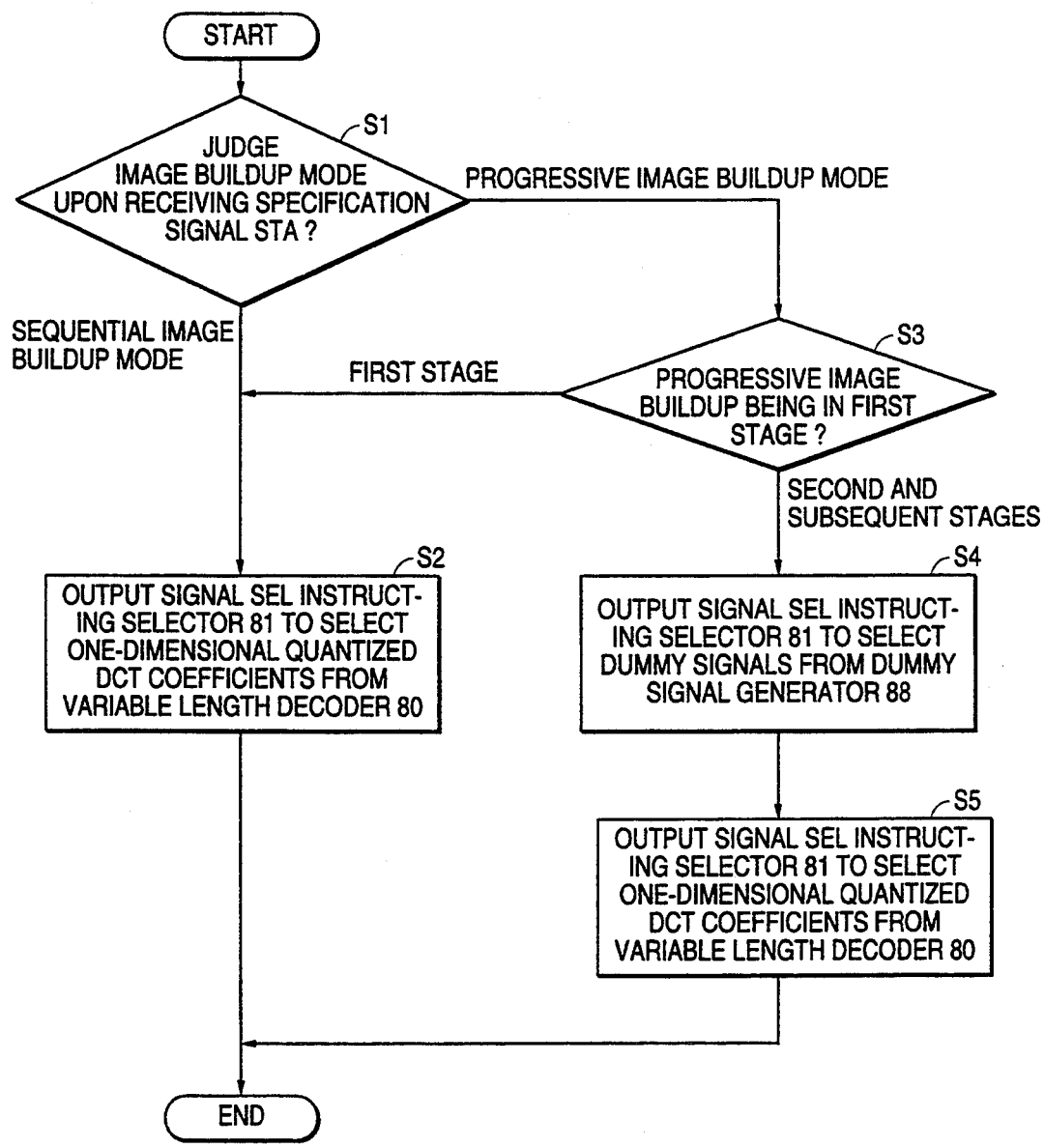
FIG. 15 is a flowchart showing the control logic of a dequantization controller for use in a progressive image buildup.

FIG. 15 is a flowchart showing the controls by the dequantization controller 83 described earlier.

After an image buildup starts, step S1 begins. Step S1: The dequantization controller 83 determines whether the image reconstruction is in the sequential image buildup mode or in the progressive image buildup mode, upon receiving the specification signal STA.

When the image reconstruction is determined to be in the sequential image buildup mode, the control proceeds to step S2.

When the image reconstruction is determined to be in the progressive image buildup mode, the control proceeds to step S3.

Step S2: Since the image data is reconstructed in a single pass, the dequantization controller 83 outputs to the selector 81 a selection signal SEL instructing the selector 81 to select one-dimensional quantized DCT coefficients decoded by the variable length decoder 80. This causes the output terminal 91 to output two-dimensional dequantized DCT coefficients in the sequential image buildup mode.

Step S3: It is judged whether or not the progressive image buildup is in the first stage.

If the decision is affirmative, the control proceeds to step S2. Since the data structure in the first stage of the progressive image buildup, e.g. having only a DC element and others being all zero, is the same as that of the sequential image buildup, step S2 is executed.

If the decision is negative, the control proceeds to step S4.

Step S4: The dequantization controller 83 outputs the selection signal SEL to the selector 81 instructing it to select the dummy signal "D0" generated by the dummy signal generator 88. The selector 81 in turn outputs the dummy signal "D0" to the the quantized coefficient receptor 84.

Step S5: Then, the dequantization controller 83 outputs the selection signal SEL to the selector 81 instructing it to select outputs from the variable length decoder 80. This change in selection causes the selector 81 to output signals having the data structure shown in FIG. 13C.

A repetition of the above steps completes the controls for processing a whole image in the sequential image buildup mode or each stage in the progressive image buildup mode until a detailed whole image is obtained.

Regardless of the stage of the progressive image buildup, the data structure of the signals, outputted from the selector 81 under control of the dequantization controller 83, comprises the difference from the preceding block or its dummy signal "D0" at the head end, runs RM and indices IN. When an image is reconstructed from the data structure, conventionally, the kinds of the data structures need to be decided first and dequantization needs to be performed according to the image buildup modes. However, since this invention configures the same circuit to dequantize decoded DCT coefficients, it eliminates the necessity for such a decision.

In a progressive image buildup, image data are reconstructed in stage units from DCT coefficients outputted from the multiplier 86 reconstructed also in stage units. After the first stage, the newly reconstructed image data are added to the hitherto reconstructed image data to obtain image data more closely representing the original image.

As described above, this invention enables a single common circuit to adaptively dequantize decoded one-dimensional quantized DCT coefficients having a data structure corresponding to either the sequential image buildup mode or the progressive image buildup mode, thereby enabling the circuit to be downsized.

Figure 16:
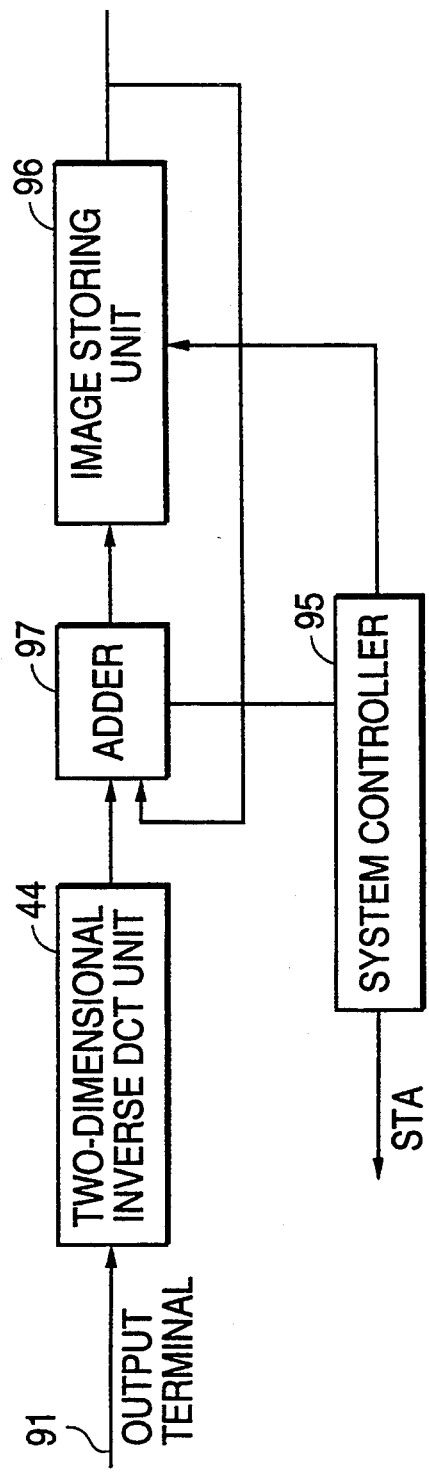
FIG. 16 is a block diagram of an image data reconstructing circuit for reconstructing image data from the decoded dequantized DCT coefficients outputted from the dequantizer shown in FIG. 14.

FIG. 16 is a block diagram of an image data reconstructing circuit for reconstructing image data from the decoded dequantized DCT coefficients outputted from the dequantizer shown in FIG. 14. A system controller 95 outputs to the dequantization controller 83 the specification signal STA specifying the sequential image buildup or the progressive image buildup, and controls an image storing unit 96 and an adder 97.

The two-dimensional inverse DCT unit 44 performs inverse DCTs on decoded dequantized DCT coefficients supplied through the output terminal 91 into reconstructed image data, which have two kinds. Image data DA will be used to refer to one kind of data for the sequential image buildup and the progressive image buildup in the first stage. Image data DB will be used to refer to the other kind of data for the progressive image buildup in the second and later stages.

The system controller 95 constantly keeps track of which kind of image data is outputted from the two-dimensional inverse DCT unit 44.

In the case of image data DA, the system controller 95 halts the operations of the adder 97, and causes the image storing unit 96 to receive and store outputs from the two-dimensional inverse DCT unit 44 "as is" at the storage addresses the system controller 95 specifies.

In the case of image data DB, the system controller 95 activates the operations of the adder 97, so that the newly inputted image data DB is added to the corresponding image data hitherto accumulated in the image storing unit 96, then stores the result in the same image storing unit 96.

The adder 97 adds image data received after stage 1 in a progressive image buildup to the image data hitherto accumulated in the image storing unit 96 for fine-tuning the reconstructed image.

FIG. 16 shows a configuration in which the system controller 95 halts the operations of the adder 97 and causes the image storing unit 96 to store the outputs from the two-dimensional inverse DCT unit 44 "as is". However, an embodiment of this invention can adopt a configuration such that the system controller 95 clears the image data stored in the image storing unit 96.

Although the image data reconstructing method and apparatus described in the above embodiments assume dummy signals or decoded data are selected, it is possible configure them to select dummy signals or coded data before being decoded.

Although the image data reconstructing method and apparatus described in the above embodiments assume image processing through two-dimensional discrete cosine transforms, this invention is also applicable to image processing through other methods of orthogonal transforms.

What is claimed is:

1. An image data reconstructing apparatus, for reconstructing an image from coded data obtained by coding quantized coefficients, which are obtained by quantizing transform coefficients obtained by an orthogonal transform of gradient values of plural picture elements in respective blocks comprising a plurality of picture elements of an original image, the image reconstructed by progressively building up from rough images in a first stage to finer images in second and later stages of a progressive image buildup mode, said image data reconstructing apparatus comprising:

a dummy data generator for generating dummy data;
   a selector, coupled to said dummy data generator, for selecting one of said dummy data and said coded data;
   a first controllers, coupled to said selector, for having said selector select only the coded data in the first stage, and said dummy data and then the coded data in the second and later stages; and
   a second controller, coupled to said selector, for accumulating a reconstructed image in the first and later stages, and outputting the reconstructed image as image data.

2. The image data reconstructing apparatus according to claim 1, wherein:

said coded data for each of the second and later stages include a run indicating a number of zero value AC element coefficients and an index indicating a value of a non-zero value AC element coefficient of a current block; and
   said coded data for the first stage include a difference of a DC element coefficient of the current block from the DC element of a preceding block, as well as the run indicating the number of zero value AC element coefficients and the index indicating the value of the non-zero value AC element coefficient of the current block.

3. The image data reconstructing apparatus according to claim 1, wherein:

said dummy data indicates a DC element coefficient is zero.

4. The image data reconstructing apparatus according to claim 2, wherein:

said orthogonal transform is a two-dimensional discrete cosine transform; and
   said transform coefficients are DCT coefficients.

5. The image data reconstructing apparatus according to claim 3, wherein:

said orthogonal transform is a two-dimensional discrete cosine transform; and
   said transform coefficients are DCT coefficients.

6. The image data reconstructing apparatus according to claim 1, wherein:

said orthogonal transform is a two-dimensional discrete cosine transform; and
   said transform coefficients are DCT coefficients.

7. An image data reconstructing apparatus, for reconstructing an image from coded data obtained by coding quantized coefficients, which are obtained by quantizing transform coefficients obtained by orthogonally transforming the gradient values of plural picture elements in respective blocks each comprising a plurality of picture elements divided from an original image, using one of a sequential image buildup mode for sequentially building up images and a progressive image buildup mode in a plurality of stages for progressively building up fine images from rough images is selected, said image data reconstructing apparatus comprising:

a dequantization controller as an image buildup mode specifier for selecting one of a sequential image buildup mode for sequentially reconstructing an image and a progressive image buildup mode for progressively reconstructing a fine image from a rough image;
   a variable length decoder for decoding coded data into one-dimensional quantized transform coefficients;
   a quantized coefficient creator for creating from one-dimensional quantized transform coefficients decoded by said variable length decoder one-dimensional quantized transform coefficients having a common data structure for both the sequential image buildup mode and the progressive image buildup mode, including a dummy signal generator for generating dummy signals to prepend to data structures of said one-dimensional quantized transform coefficients decoded by said variable length decoder during progressive image buildup;
   a quantized coefficient receptor for transforming one-dimensional quantized transform coefficients into two-dimensional quantized transform coefficients and for storing the latter;
   a quantization threshold storing unit for storing thresholds for dequantizing quantized transform coefficients;
   a multiplier as a dequantization calculator for multiplying for dequantizations two-dimensional quantized orthogonal transform coefficients stored in said quantized coefficient receptor by said thresholds stored in said quantization threshold storing unit; and
   accumulating means for outputting image data after accumulating images reconstructed in the first and later stages when the progressive image buildup mode is entered, the one-dimensional quantized transform coefficients having a common data structure for both the sequential image buildup mode and the progressive image buildup mode and being created for a specification of either one.

8. The image data reconstructing apparatus according to claim 7, wherein:

said orthogonal transform is a two-dimensional discrete cosine transform; and said transform coefficients are DCT coefficients.

9. An image data reconstructing method for reconstructing an image from coded data obtained by coding quantized coefficients, which are obtained by quantizing transform coefficients obtained by orthogonally transforming the gradient values of plural picture elements in respective blocks each comprising a plurality of picture elements divided from an original image, using one of a sequential image buildup mode for sequentially building up images and a progressive image buildup mode for progressively building up in a plurality of stages fine images from rough images, said image data reconstructing method comprising the steps of:

(a) decoding coded data into one-dimensional quantized transform coefficients;

(b) creating one-dimensional quantized transform coefficients having a common data structure for use by both the sequential image buildup mode and the progressive image buildup mode, including prepending dummy signals decoded in step (a) during a progressive image buildup to the one-dimensional quantized transform coefficients for stages after a first stage;

(c) transforming said one-dimensional quantized transform coefficients created in step (b) into two-dimensional quantized transform coefficients;

(d) storing thresholds in preparation for dequantizing quantized transform coefficients into dequantized transform coefficients;

(e) dequantizing said two-dimensional quantized transform coefficients obtained in step (c) by said thresholds stored in step (d), the thresholds stored in step (d) being used to sequentially dequantize said quantized transform coefficients created in steps (b) and (c) regardless of which image buildup mode is selected in step (e); and (f) outputting image data after accumulating image reconstructed in the first and later stages when the progressive image buildup mode is selected.

10. The image data reconstructing method according to claim 9, wherein:

said orthogonal transform is a two-dimensional discrete cosine transform; and said transform coefficients are DCT coefficients.

11. An image data reconstructing apparatus, for reconstructing an image from coded data obtained by coding quantized coefficients, which are obtained by quantizing transform coefficients obtained by orthogonally transforming the gradient values of plural picture elements in respective blocks each comprising a plurality of picture elements divided from an original image in which either the sequential image buildup mode for sequentially building up images or the progressive image buildup mode for progressively building up fine images from rough images is selected;

said image data reconstructing apparatus comprising:

a dequantization controller as an image buildup mode specifier for selecting either the sequential image buildup mode for sequentially reconstructing an image or the progressive image buildup mode for progressively reconstructing a fine image from a rough image;

a variable length decoder for decoding coded data into one-dimensional quantized transform coefficients;

a quantized coefficient creator for creating from one-dimensional quantized transform coefficients decoded by said variable length decoder one-dimensional quantized transform coefficients having a common data structure for both the sequential image buildup mode and the progressive image buildup mode, including:

a dummy signal generator for generating dummy signals to be attached to the head ends of data structures of said one dimensional quantized transform coefficients decoded by said variable length decoder during a progressive image buildup and a selector, which may be a multiplexer, for selecting the one dimensional quantized transform coefficients from said variable length decoder and dummy signals from said dummy signal generator;

a quantized coefficient receptor for transforming one-dimensional quantized transform coefficients into two-dimensional quantized transform coefficients and for storing the latter;

a quantization threshold storing unit for storing thresholds for dequantizing quantized transform coefficients; and a multiplier as a dequantization calculator for multiplying for dequantizations two-dimensional quantized orthogonal transform coefficients stored in said quantized coefficient receptor by said thresholds stored in said quantization threshold storing unit:

wherein:

one-dimensional quantized transform coefficients having a data structure common to both the sequential image buildup mode and the progressive image buildup mode are created for a specification of either one, and when said dequantization controller specifies a progressive image buildup, said selector attaches dummy signals to the head ends of data structures of one-dimensional quantized transform coefficients outputted from said variable length decoder in the second and later stages.

12. The image data reconstructing apparatus according to claim 11, wherein:

said orthogonal transform is a two-dimensional discrete cosine transform; and said transform coefficients are DCT coefficients.

13. An image data reconstructing apparatus, for reconstructing an image from coded data obtained by coding quantized coefficients, which are obtained by quantizing transform coefficients obtained by orthogonally transforming the gradient values of plural picture elements in respective blocks each comprising a plurality of picture elements divided from an original image, in which either the sequential image buildup mode for sequentially building up images or the progressive image buildup mode for progressively building up fine images from rough images is selected:

said image data reconstructing apparatus comprising:

a dequantization controller as an image buildup mode specifier for selecting either the sequential image buildup mode for sequentially reconstructing an image or the progressive image buildup mode for progressively reconstructing a fine image from a rough image;

a variable length decoder for decoding coded data into one-dimensional quantized transform coefficients;

a quantized coefficient creator for creating from one-dimensional quantized transform coefficients decoded by said variable length decoder one-dimensional quantized transform coefficients having a common data structure for both the sequential image buildup mode and the progressive image buildup mode and having a dummy signal generator for generating dummy signals to be attached to the head ends of data structures of said one-dimensional quantized transform coefficients decoded by said variable length decoder during a progressive image buildup;

a quantized coefficient receptor for transforming one-dimensional quantized transform coefficients into two-dimensional quantized transform coefficients and for storing the latter;

a quantization threshold storing unit for storing thresholds for dequantizing quantized transform coefficients; and a multiplier as a dequantization calculator for multiplying for dequantizations two-dimensional quantized orthogonal transform coefficients stored in said quantized coefficient receptor by said thresholds stored in said quantization threshold storing unit:

wherein:

one-dimensional quantized transform coefficients having a data structure common to both the sequential image buildup mode and the progressive image buildup mode are created for a specification of either one.

14. The image data reconstructing apparatus according to claim 13, wherein:

dummy signals generated by said dummy signal generator are transform coefficients having zero values.

15. The image data reconstructing apparatus according to claim 14, wherein:

said orthogonal transform is a two-dimensional discrete cosine transform; and said transform coefficients are DCT coefficients.

16. The image data reconstructing apparatus according to claim 13, wherein:

said orthogonal transform is a two-dimensional discrete cosine transform; and said transform coefficients are DCT coefficients.

17. An image data reconstructing method for reconstructing an image from coded data obtained by coding quantized coefficients, which are obtained by quantizing transform coefficients obtained by orthogonally transforming gradient values of plural picture elements in respective blocks formed of a plurality of picture elements in an original image, using one of a sequential image buildup mode for sequentially building up images and a progressive image buildup mode for progressively building up fine images from rough images, said image data reconstructing method comprising the steps of:

(a) decoding coded data into one-dimensional quantized transform coefficients;

(b) creating one-dimensional quantized transform coefficients having a common data structure for use by both the sequential image buildup mode and the progressive image buildup mode, including prepending dummy signals decoded in step (a) during a progressive image buildup to the one-dimensional quantized transform coefficients for stages after a first stage;

(c) transforming the one-dimensional quantized transform coefficients created in step (b) into two-dimensional quantized transform coefficients;

(d) storing thresholds in preparation for dequantizing quantized transform coefficients into dequantized transform coefficients; and (e) sequentially dequantizing the two-dimensional quantized transform coefficients obtained in step (c) using the thresholds stored in step (d) regardless of which image buildup mode is used.

18. The image data reconstructing method according to claim 17, wherein: said dummy signals are transform coefficients having zero values.

19. The image data reconstructing method according to claim 18, wherein:

said orthogonal transform is a two-dimensional discrete cosine transform; and said transform coefficients are DCT coefficients.

20. The image data reconstructing method according to claim 17, wherein:

said orthogonal transform is a two-dimensional discrete cosine transform; and said transform coefficients are DCT coefficients.

* * * * *

UNITED STATES PATENT AND TRADEMARK OFFICE
CERTIFICATE OF CORRECTION

PATENT NO. : 5,369,502

DATED : November 29, 1994

INVENTOR(S) : Fukuda et al.

It is certified that error appears in the above-indentified patent and that said Letters Patent is hereby corrected as shown below:

Col. 4, line 31, "FIG. 1C," should be --FIG. 11C,--.

Col. 11, line 49, "controllers," should be --controller,--.

Signed and Sealed this

Twenty-eight Day of February, 1995

Attest:

BRUCE LEHMAN

Attesting Officer      Commissioner of Patents and Trademarks